Dec. 10, 1929.   E. A. GUSTAFSON   1,738,771
SPEEDOMETER DRIVE
Filed June 8, 1927
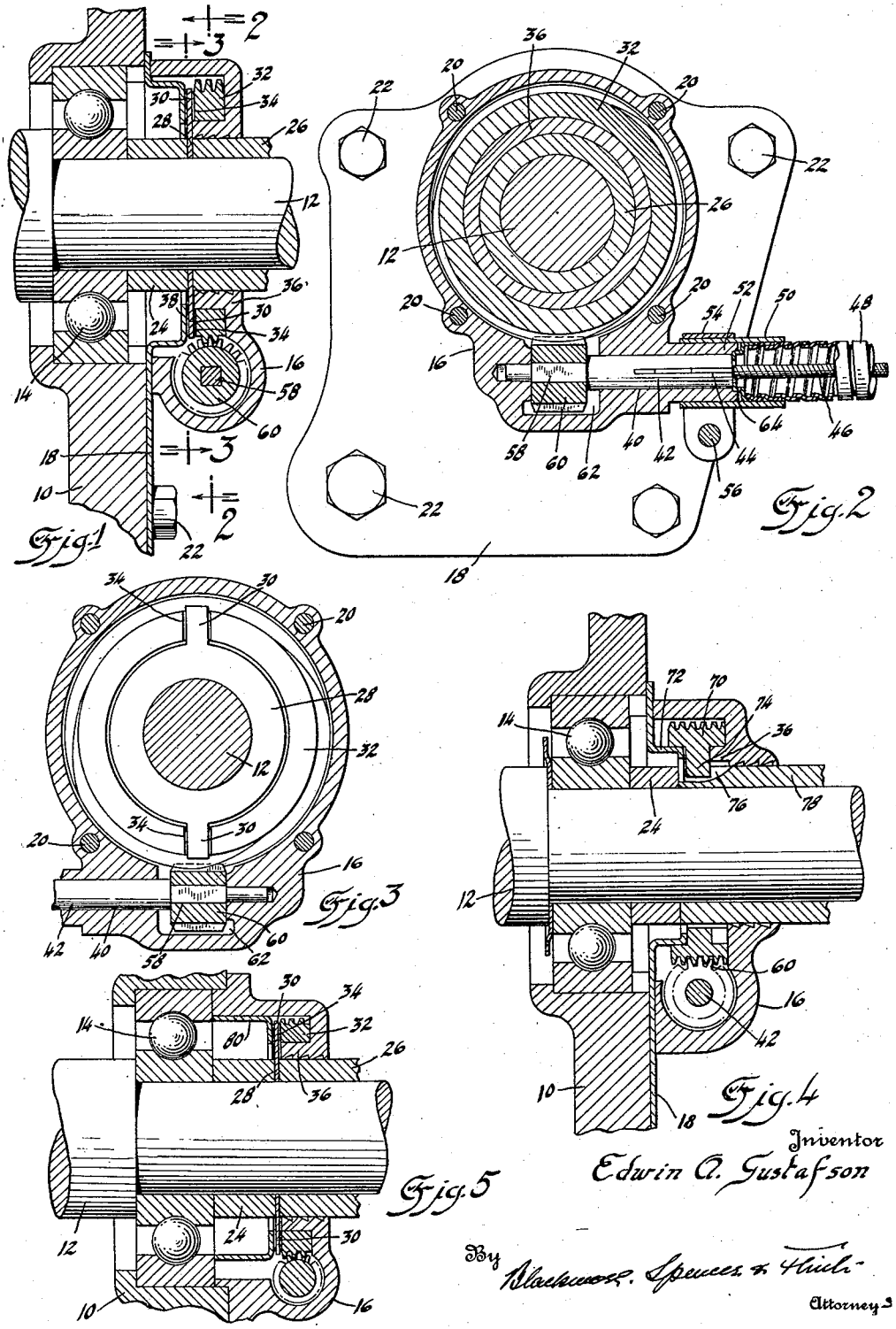

Patented Dec. 10, 1929

1,738,771

UNITED STATES PATENT OFFICE

EDWIN A. GUSTAFSON, OF FLINT, MICHIGAN, ASSIGNOR TO A C SPARK PLUG COMPANY, OF FLINT, MICHIGAN, A COMPANY OF MICHIGAN

SPEEDOMETER DRIVE

Application filed June 8, 1927. Serial No. 197,406.

My invention relates to an improved speedometer drive of the type commonly used to drive the speedometer from the transmission of a motor vehicle.

Ordinarily the transmission end of this drive is encased in a small housing which is bolted to the transmission casing. Due to the fact that the transmission casing of each make of vehicle is different from the others, it has been necessary for the speedometer manufacturer to produce and carry in stock many different kinds of housings.

I propose to standardize these various types of housings in order to lower their cost. Instead of constructing them so that they may be attached directly to the transmission casing, I prefer to fasten the housing to a plate and then bolt the plate to the transmission casing. With this method it is only necessary to form the plates to suit the individual transmmission casing, and as the plates are merely stampings, they are much cheaper to manufacture and may be carried in stock easier.

A further object is to provide a simplified and satisfactory method of attaching the flexible driving member to the speedometer drive housing without the use of nuts or threads.

With the above and other objects in view my invention will be more clearly understood by referring to the specification and accompanying drawing, in which:

Figure 1 is a fragmentary longitudinal section through the center of a transmission, showing my improved speedometer drive associated therewith.

Figure 2 is a section taken on the line 2—2 of Figure 1.

Figure 3 is a section taken on the line 3—3 of Figure 1.

Figure 4 is a view corresponding to Figure 1 but showing a slightly modified form of drive.

Figure 5 is a view corresponding to Figure 1 but showing a still different arrangement.

The reference numeral 10 indicates a transmission casing within which is supported the transmission shaft 12 in the bearing 14. The transmission casing is usually provided with threaded openings to permit the securing of the speedometer drive housing to the transmission casing. As stated above, the transmission casing of each make of vehicle is different and the spacing of these threaded openings is apt to vary. Therefore a different speedometer drive housing must be provided for each make of vehicle and consequently the cost is comparatively high. I prefer to standardize these various speedometer drive housings into one type, and to mount this standard housing 16 on a plate 18 by rivets 20 or in any other suitable manner. By making all of these housings exactly the same, it will be seen that the production will be greatly increased and the cost thereby lowered. A special plate 18 will have to be provided for each make of transmission casing to suit the spacing of the threaded openings, but as these plates are merely stampings and are very cheap to manufacture, this is not objectionable. This plate is secured to the transmission casing by capscrews 22.

Clamped between a spacer 24 and a universal joint flange member 26 is a flat disc 28 having projections 30. This disc, rotating with the shaft 12, serves to drive a driving gear 32 which has slots 34 into which the projections 30 fit. The gear 32 is journalled upon a bearing portion 36 formed in the housing 16. The stamping 18 is formed with a cup-shaped portion 38 which lies within the housing 16 and which serves to prevent axial movement of the gear 32 in the one direction, the housing 16 preventing axial movement in the other direction.

The housing 16 is provided with a passage 40 in which is journalled a shaft 42, hollow at its outer end and having a slot 44 adapted to receive a key on a flexible shaft 46 which rotates within a flexible tube 48. Staked or otherwise fastened to the tube is a split sleeve 50 which fits over portion 52 of the housing 16 and is held thereon by clamp 54 and bolt 56. The inner end of the shaft is squared as at 58 to fit into and be driven by a driven gear 60 which is held in a recess 62 in the housing 16 and which meshes with the driving gear 32. A stamped washer 64 is pressed into the portion 52 of the housing and serves to hold the shaft 42 in place during shipment and also to take the outward thrust of the shaft when in operation.

In Figure 4 another form is shown, in which the driving gear 70 is supported partly on the portion 36 of the housing and partly on the cup-shaped portion 72 of the stamping 18. A projection 74 formed on the gear extends down into a keyway 76 in the universal joint flange 78 for the purpose of driving the gear from the shaft 12.

In Figure 5 a still different form is shown in which the housing 16 as fastened directly to the transmission casing 10. A cup-shaped stamping 80 fits within the housing and serves to hold the gear 32 in place.

It is thought from the foregoing taken in connection with the accompanying drawing that the construction and operation of the device will be apparent to those skilled in the art, and that various changes in size, shape, and proportion and details of construction may be made without departing from the spirit and scope of the appended claims.

I claim:

1. The method of securing a standardized instrument drive housing to any one of a plurality of casings, consisting in providing attaching plates of suitable size and dimensions for each of said casings and securing one of said standardized housings to each of said plates.

2. An instrument drive comprising, in combination, a casing, an instrument drive housing supported from said casing, a bearing portion in said housing, a gear journalled upon said bearing portion, and a cup-shaped member located within said housing and serving to limit the axial movement in one direction of the gear.

3. An instrument drive comprising, in combination, a casing, a plate secured to said casing, an instrument drive housing mounted upon said plate, a bearing portion formed in said housing, and a gear journalled upon said bearing portion.

4. An instrument drive comprising, in combination, a casing, a shaft rotatably mounted in said casing, an instrument drive housing adapted to be supported from said casing, a bearing portion formed in said housing, a gear journalled upon said bearing portion, and means associated with said shaft to drive said gear therefrom.

5. An instrument drive comprising, in combination, a casing, a shaft rotatably mounted in said casing, an instrument drive housing adapted to be supported from said casing, a bearing portion formed in said housing, a gear journalled upon said bearing portion, slots in said gear, a washer driven from said shaft, and projections on said washer adapted to fit into said slots for the purpose of driving said gear.

6. An instrument drive comprising, in combination, a casing, a plate secured to said casing, an instrument drive housing mounted upon said plate, said plate being provided with a cup-shaped portion lying within said housing, a bearing portion formed in said housing, a gear journalled on said housing, said gear being held from axial movement in one direction by said housing and in the other by said cup shaped portion.

7. A speedometer drive comprising, in combination, a transmission casing, a shaft protruding from said casing, a plate secured to said casing, a housing fastened to said plate, a bearing portion formed in said housing, a gear journalled on said bearing portion, and means to drive said gear from said shaft.

8. An instrument drive comprising, in combination, an instrument drive housing, a flexible driving shaft, a flexible tube encasing said shaft, and a split sleeve secured to said tube and adapted to clamp said tube to said housing.

9. An instrument drive comprising in combination, an instrument drive housing, a shaft journalled in said housing, a flexible driving shaft in driving engagement with said shaft, a washer between said member and said housing serving to hold said shaft in position, a flexible tube encasing said flexible shaft, and a split sleeve secured to said tube and adapted to clamp said tube to said housing.

In testimony whereof I affix my signature.

EDWIN A. GUSTAFSON.